Dec. 20, 1966  R. MICHEL  3,292,372
STEAM POWER GENERATING PLANT
Filed March 23, 1964  3 Sheets-Sheet 1

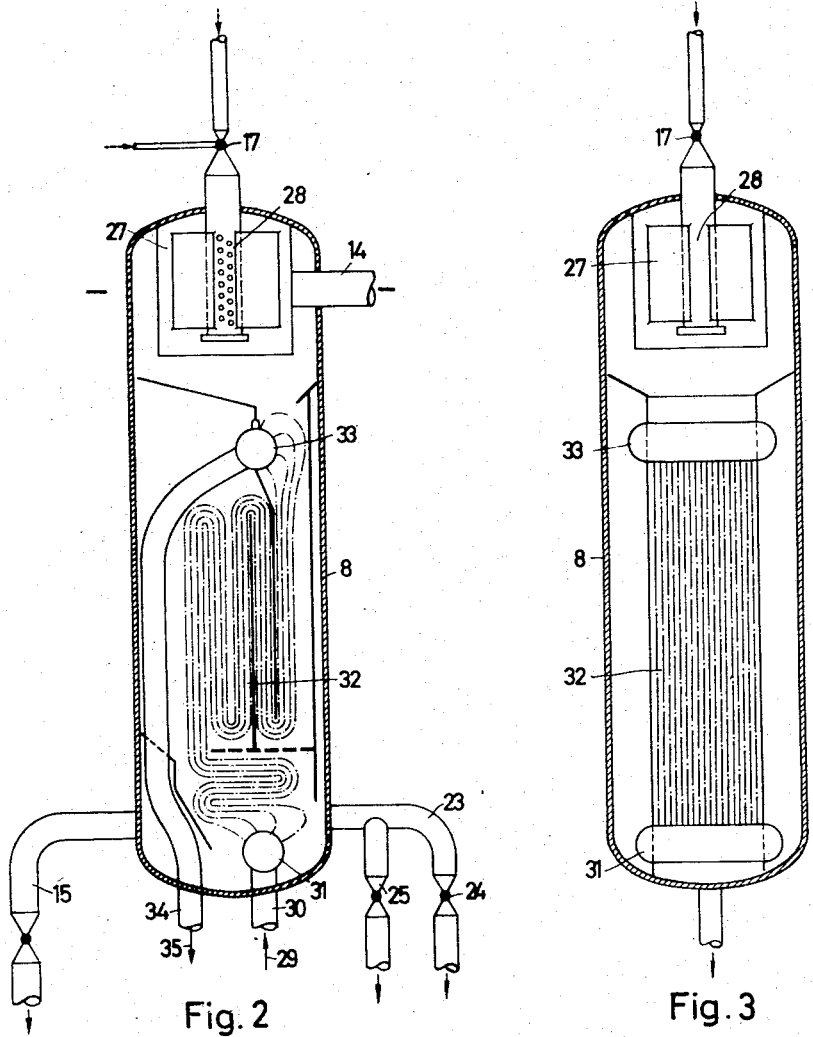
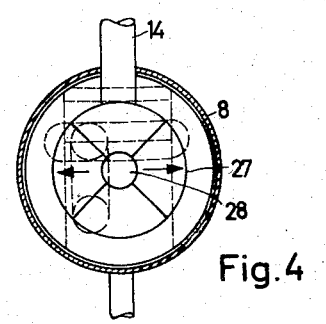

United States Patent Office 3,292,372
Patented Dec. 20, 1966

3,292,372
STEAM POWER GENERATING PLANT
Rupprecht Michel, Erlangen, Germany, assignor to Siemens-Schuckertwerke Aktiengesellschaft, Berlin-Siemensstadt and Erlangen, Germany, a German corporation
Filed Mar. 23, 1964, Ser. No. 354,166
Claims priority, application Germany, Mar. 23, 1963, S 84,328
8 Claims. (Cl. 60—73)

My invention relates to a steam power generating plant especially a unit type station with forced flow boiler and intermediate superheating. For such steam power generating plants it has proved necessary to provide starting vessels in order to achieve when starting the boiler a separation of the generated steam-water mixture and further to drain off the water and simultaneously to conduct the separated steam to the intermediate superheater for cooling said superheater. A starting vessel of this type is generally only required for the starting process, while during normal operation of the boiler this vessel will not be used or will be used only in special cases.

It is the object of this invention to utilize a vessel of the type as described above also for normal operation of the boiler.

It is a characteristic of the invention that the starting vessel is combined with the regenerative preheating apparatus which is connected with the inlet of the intermediate superheater in a single casing. It is a further characteristic of the invention that the complete preheating surfaces together with the condensation water cooler and steam cooler may be arranged in the interior of the starting vessel casing.

The starting vessel and the upper regenerative preheating stage have in general the same pressure level and substantially the same exterior dimensions. If according to the invention the starting vessel is combined with this regenerative preheater, one does not only have the advantage that an additional large container with drain-off control is no longer required, but also the further advantage that the water separated during the starting process will be cooled by the pipes conducting the cold feed water.

In steam power generating plants with the conventional separate starting vessel the drain-off of water at boiling temperature causes difficulties and necessitates installing essentially overdimensional control valves because the pressure reduction of the hot water causes steam generation and the thus generated large steam quantities interfere with the drain-off.

Since the starting vessel is essentially situated behind a pressure reducing valve, the pressure in the starting vessel will be a medium pressure between high and low pressure. For this reason, one had to take into account with conventional separate starting vessels that there was a continuous steam condensation, and to drain off the condensing water it was necessary to install the vessel at a high point in the upper region of the boiler structure.

Compared with the conventional vessel the invention makes it possible to install the vessel at a lower point.

It is a further characteristic of the invention that the starting vessel combined with the preheating surfaces may be arranged preferably within the boiler unit and, therefore, the regulating equipment may be installed in front of said vessel.

In case of a vertical installation of the vessel it may be of advantage to mount the high-pressure reducing valve axially on top of this vessel and to provide in the upper part of said vessel means for separation of the water-steam mixture.

Preferably the vessel contains two drain-off valves, of which the one with a larger cross-section serves the starting process. Said valve opens the inlet to the feed-water container or to a waste drainage outside the boiler system and it is controlled by a higher situated water level, in order to achieve in this manner a more efficient cooling of the drained-off water. Besides, a smaller drain-off valve may be installed which is controlled by a lower situated water level. This second drain-off valve serves the drain-off of the condensing water forming during continuous operation into the next lower regenerative preheating stage as is normally the case in multistage regenerative preheating systems.

The starting vessel may be constructed vertically as well as horizontally as a cylindrical vessel, whereby in a vertical arrangement the pressure-reducing valve may be mounted axially on the vessel, and in case of a horizontal boiler arrangement the separator for separation of the steam-water mixture should be mounted in a container to be installed on top of the horizontal boiler.

In both kinds of arrangements tangential instead of axial steam inlet is also possible and may facilitate the separation of water by means of tangential force. Below the separator, means, e.g. guiding plates, are provided which conduct the water developing during the starting process to the drain-off at the inlet of the steam-cooler stage and at the same time have the purpose to lead the entering steam. The walls of the upper part of the vessel may be equipped with cooling pipes which are supplied by the feed-water flow parallel to the preheater, in order to cool the walls of the vessel even if the cooling means of the high-pressure-reducing valve should be insufficient.

With reference to the drawings the invention will be described in detail below.

The drawings show a practical example and some modifications with the essential parts of the invention in simplified and partly schematic representation.

FIGURES 2, 3 and 4 show a practical example of the combined starting vessel in three sections perpendicular to each other.

Figure 1:
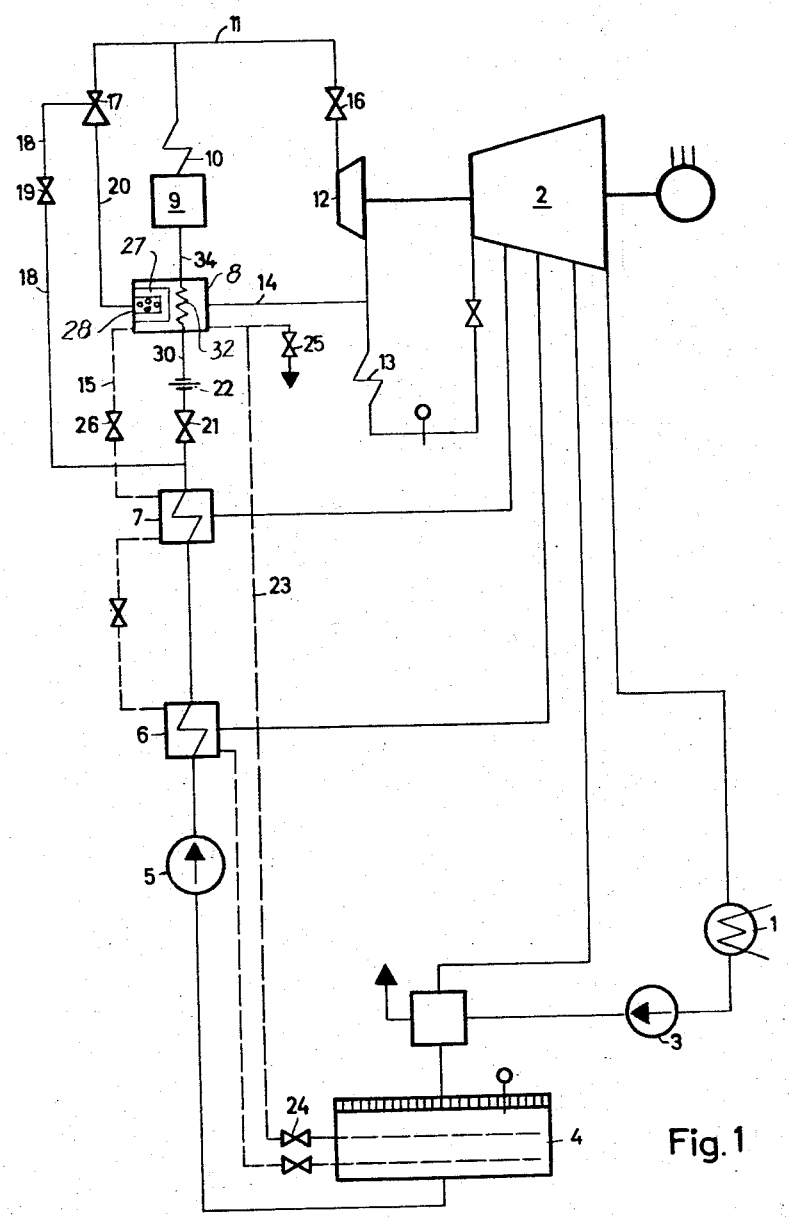
FIGURE 1 shows a connection diagram of a steam generating plant according to the invention.

Referring to FIGURE 1 of the drawings, the water from the condenser 1 of the steam turbine 2 is fed by the condensation water pump 3 to the feed-water container 4. From the feed-water container 4, the feed-water pump 5 feeds the water through a series of regenerative preheating stages, of which the three stages 6, 7 and 32 are indicated. The boiler is designated by 9, the superheater by 10, the high-pressure steam pipe by 11. Between the high-pressure turbine 12 and the low-pressure turbine 2, the intermediate superheater 13 is shown.

The upper regenerative preheating stage 32 in a starting vessel 8 is supplied during normal operation through the pipe 14 with steam from the pipe connected with the inlet of the intermediate superheater 13. In conventional manner, the preheater is equipped with a drain pipe 15 leading to the preceding preheater stage 7 and contains a condensation water cooler, a preheater and a steam cooler.

For starting the unit type steam power generating plant, the valve 16 situated in the steam inlet for the turbines 12 and 2 is closed, and the high-pressure-reducing valve 17 is opened to pass steam produced in the boiler 9 through the pipe 20 to the starting vessel 8. The high-pressure-reducing valve 17 may be of such a conventional type that it achieves simultaneously a throttling as well as a cooling of the steam from the pipe 11 by the injection from the injection pipe 18 with the valve 19 of a defined amount of water supplied by the pump 5 from the feed-water container 4. In former conventional units, the drain-off pipe 20 of the high-pressure-reducing valve had been connected with a separate starting vessel from which, after separation of the water-steam mixture, the water was led to the feed-water container, while the steam was fed to the intermediate superheater for cooling the latter.

According to the invention the starting vessel is now combined with the regenerative preheater in a single common casing, said preheater 32 being connected with the intermediate superheater 13. The pipe 14, which during normal operation of the plant, leads steam from the superheater 13 inlet pipe to the vessel 8, is traversed during the starting process by steam traveling in the opposite direction, to ensure in this way that when the valve 16 is closed and the turbines 12 and 2 are not yet in operation a sufficient supply of steam flow to the intermediate superheater 13 takes place.

Figure 5:
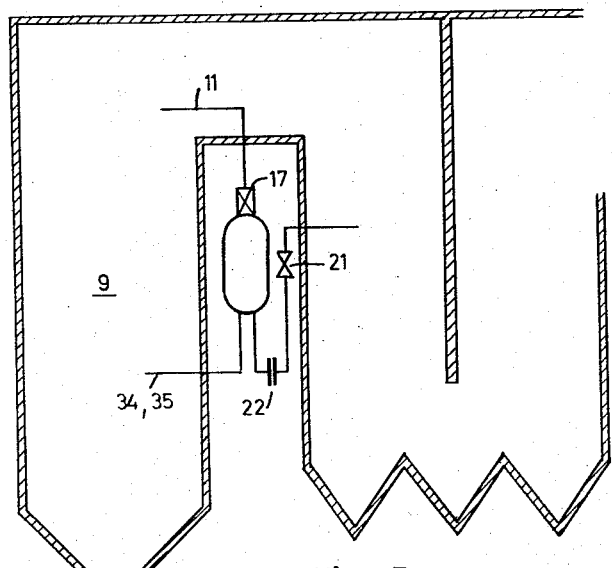
FIGURE 5 shows the arrangement of the vessel in relation to the boiler.

As FIGURE 5 shows, the vessel 8 may now form a part of the boiler structure, thus making it possible to install the feed-water control valve 21 and a measuring throttle device for supervision of the feed-water flow directly in front of the boiler.

During the starting process and in case of sudden overload the high-pressure-reducing valve 17 is opened. The reducing valve will be closed however during normal operation, and the valve in the high-pressure steam pipe 11 will be fully opened instead.

During the starting process the water aggregating in the vessel 8 flows through the pipe 23 to the feed-water container 4. The valve 24 is thereby controlled by a relatively high water level in the vessel, in order to improve the cooling of the drain water. The drain control valve 24 may be closed automatically if the pressure in the feed-water container 4 should for any reason whatsoever become higher than the pressure in the vessel 8, as it could happen in case of restarting after a short shut-down. The drain-off in that case is performed through the valve 25 to a waste drainage outside the boiler system until the pressure in the vessel 8 exceeds the pressure in the feed-water container 4 again.

During normal operation the valves 24 and 25 are closed and the drain-off takes place through the pipe 15 and the valve 26 in said pipe 15 to the preceding regenerative preheating stage 7. The drain-off regulation over the pipe 15 may be performed through control of the valve 26 by a lower situated water level.

FIGURES 2, 3 and 4 show a practical example of a vessel in three sections perpendicular to each other which corresponds to the vessel 8 shown in FIGURE 1. This vessel may have protracted cylindrical form, whereby the high-pressure-reducing valve is axially mounted on top. In the upper part of the vessel, plates 27 and 28 are provided to achieve separation of the water-steam mixture.

The arrangement of said plates may also be seen from FIGURE 4. In this region the pipe 14 branches off which is connected with the inlet of the intermediate superheater 13 (FIGURE 1) and through which during the starting process steam flows off, while during normal operation, bleeder steam for regenerative preheating is led in. In the practical example shown, the installed plates are used to guide the water which aggregates during the starting process to the inlet of the steam cooling stage, and during normal operation they serve to guide the inflowing steam in this place.

The feed-water enters the pipe 30 in the direction of the arrow 29, flows to the distributor 31 and branches out into the parallel pipe system 32 at the end of which the collector 33 is installed. Through the pipe 34 the feed-water leaves the vessel 8 in the direction 35 and flows to the inlet of the boiler 9 (FIGURE 1).

Figure 6:
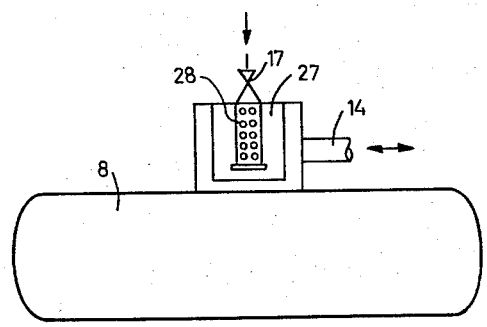
FIGURE 6 shows a modified arrangement and construction of the vessel in horizontal position.

FIGURE 6 shows the separator of the steam-water mixture above the vessel 8 in a separate casing.

Figure 7:
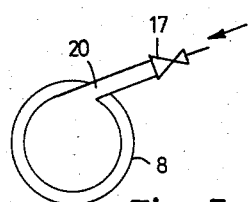
FIGURE 7 shows a top plan view of the upper part of the vessel in modified construction.

FIGURE 7 shows a tangential inlet of the already pressure-reduced steam through the pipe 20 to the steam-water separator.

Figure 8:
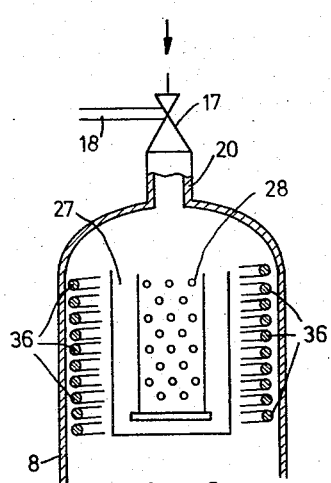
FIGURE 8 shows a sectional view of the upper part of the vessel in modified construction.

FIGURE 8 shows the upper part of the vessel 8 with a pipe system 36 for cooling the walls of said vessel in case of insufficient cooling by the high-pressure-reducing valve.

I claim:
1. A steam power generating plant comprising a turbine having high and low pressure stages, a forced flow boiler connected by a high-pressure steam line with the high pressure stage of said turbine, an intermediate superheater connected between the high and low pressure stages of said turbine, a plurality of feed water regenerative preheating stages connected to the low pressure stage of said turbine, and a starting vessel comprising a water-steam separator encased in common with another regenerative preheating stage, said starting vessel being connected through a high-pressure reducing valve with said high pressure steam line and said other regenerative preheating stage being connected to the inlet of said intermediate superheater.

2. A steam power plant according to claim 1 wherein said starting vessel comprises a substantially cylindrical body having a horizontally disposed longitudinal axis and separating means for separating water-steam mixture supplied to said starting vessel, said separating means being housed in a container separate from said cylindrical body, said high-pressure reducing valve being mounted on said container.

3. A steam power plant according to claim 1, in which said starting vessel including said other preheating stage forms a part of the boiler, and including feed-water regulating means connected to said part.

4. A steam power plant according to claim 1, including guiding plates cooperating with said separator and encased in said starting vessel for guiding, to a line connected between the high pressure stage of said turbine and said intermediate superheater, water separated from water-steam mixture supplied to said starting vessel, said line during normal operation being adapted to conduct steam from said high pressure stage to said other regenerative preheating stage.

5. A steam power plant according to claim 1, including a feed water container and a regenerative preheating stage preceding and connected to said starting vessel, a first drain valve connected between said starting vessel and said feed water container for permitting drain-off flow to said feed water container during the starting process, said first valve being controlled by an elevated water level in said starting vessel and a second drain valve connected between said starting vessel and said preceding regenerative preheating stage, said second valve being controlled by a lower water level for conducting condensation water accumulating in said starting vessel during normal operation to a preceding regenerative preheating stage, said preceding regenerative preheating stage being serially connected with said other regenerative preheating stage.

6. A steam power plant according to claim 5, including a discharge line connected to said starting vessel and having a third drain valve actuable for discharging water from said starting vessel through said discharge line whenever the water becomes unsuitable due to excessive salt content and whenever pressure in said feed water container exceeds the pressure in said starting vessel.

7. A steam power plant according to claim 1 in which said starting vessel comprises a condensation-water cooler and a steam cooler combined in one constructional unit.

8. A steam power plant according to claim 1 in which said starting vessel comprises a substantially cylindrical body having a longitudinal axis, said high-pressure-reducing valve being mounted along said axis on said body.

References Cited by the Examiner

UNITED STATES PATENTS 2,566,732   9/1951   Krieg _____ 261—108

FOREIGN PATENTS 525,617   1/1954   Belgium.

MARTIN P. SCHWADRON, *Primary Examiner.*

ROBERT R. BUNEVICH, *Examiner.*